(12) United States Patent
Kim et al.

(10) Patent No.: US 11,987,291 B2
(45) Date of Patent: May 21, 2024

(54) FLOOR STRUCTURE

(71) Applicants: Hyundai Motor Company, Seoul (KR); Kia Corporation, Seoul (KR); Hanbat National University Industry-Academic Cooperation Foundation, Daejeon (KR)

(72) Inventors: Minsoo Kim, Suwon-si (KR); Jung Jong Chun, Seoul (KR); Jai Hak Kim, Gunpo-si (KR); Kwangbok Shin, Daejeon (KR); Seunggu Kang, Daejeon (KR); Jaemoon Im, Daejeon (KR)

(73) Assignees: Hyundai Motor Company (KR); Hanbat National University Industry-Academic Cooperation Foundation (KR); Kia Corporation (KR)

( * ) Notice: Subject to any disclaimer, the term of this patent is extended or adjusted under 35 U.S.C. 154(b) by 400 days.

(21) Appl. No.: 17/643,116

(22) Filed: Dec. 7, 2021

(65) Prior Publication Data
US 2022/0410973 A1  Dec. 29, 2022

(30) Foreign Application Priority Data
Jun. 23, 2021  (KR) .................. 10-2021-0081362

(51) Int. Cl.
| | |
|---|---|
| B62D 21/15 | (2006.01) |
| B60N 2/005 | (2006.01) |
| B62D 21/02 | (2006.01) |
| B62D 25/20 | (2006.01) |
| B62D 29/00 | (2006.01) |
| B62D 29/04 | (2006.01) |

(Continued)

(52) U.S. Cl.
CPC ............ B62D 21/15 (2013.01); B60N 2/005 (2013.01); B62D 21/02 (2013.01); B62D 25/20 (2013.01); B62D 29/008 (2013.01); B62D 29/041 (2013.01); B60K 1/04 (2013.01); *B60K 2001/0438* (2013.01); *B60N 2/015* (2013.01); *B60Y 2304/03* (2013.01); *B60Y 2306/01* (2013.01); *B62D 21/00* (2013.01); *B62D 21/157* (2013.01); *B62D 25/2036* (2013.01); *B62D 29/001* (2013.01); *B62D 29/005* (2013.01)

(58) Field of Classification Search
CPC .... B62D 25/20; B62D 21/157; B62D 25/025; B62D 21/15; B62D 29/008; B62D 29/041; B62D 21/02; B62D 29/001; B62D 25/2036; B62D 21/00; B62D 29/005; B60N 2/005; B60N 2/015; B60K 2001/0438; B60K 1/04; B60Y 2304/03; B60Y 2306/01
USPC ............... 296/193.07, 187.02, 209, 187.08
See application file for complete search history.

(56) References Cited

U.S. PATENT DOCUMENTS

| | | | | |
|---|---|---|---|---|
| 6,805,401 B2 * | 10/2004 | Hayashi | ............... | B62D 21/152 296/193.07 |
| 2016/0311382 A1 * | 10/2016 | Murasawa | ............ | B60R 13/083 |

* cited by examiner

*Primary Examiner* — Amy R Weisberg
*Assistant Examiner* — Dana D Ivey
(74) *Attorney, Agent, or Firm* — Slater Matsil, LLP (57) ABSTRACT

An embodiment floor structure of a vehicle includes a pair of side seals disposed to face each other in a vehicle width direction, and respectively disposed in a vehicle length direction, a floor frame disposed between the pair of side seals and including a pair of longitudinal frames respectively arranged along the pair of side seals and at least one transverse frame mounted between the pair of longitudinal frames in the vehicle width direction, and at least one core (Continued)

structural member disposed in a space provided by the floor frame and including a material for absorbing impact.

20 Claims, 6 Drawing Sheets

(51) Int. Cl.
*B60K 1/04* (2019.01)
*B60N 2/015* (2006.01)
*B62D 21/00* (2006.01)

FLOOR STRUCTURE

CROSS-REFERENCE TO RELATED APPLICATIONS

This application claims the benefit of Korean Patent Application No. 10-2021-0081362, filed on Jun. 23, 2021, which application is hereby incorporated herein by reference.

TECHNICAL FIELD

The present disclosure relates to a floor structure.

BACKGROUND

Recently, in order to expand the interior space of a floor structure of a vehicle, the use of a hidden rail that hides the seat rail under the floor panel is increasing.

In addition, there is an increasing need for a flat floor without a tunnel structure of a floor panel applied to existing internal combustion vehicles.

In addition, various technologies are applied to the floor structure of the vehicle to ensure the safety of passengers in the event of a crash.

Meanwhile, in order to reduce the weight of the floor structure of a vehicle to improve fuel efficiency, an attempt is made to increase the strength of the frame material and reduce the thickness thereof.

However, when the thickness of the frame material is reduced, there is a drawback in that the bending rigidity of the frame is reduced.

Therefore, it is necessary to research and develop a floor structure suitable for collision stability while securing both weight reduction and bending rigidity.

The above information disclosed in this Background section is only for enhancement of understanding of the background of the invention, and therefore it may contain information that does not form the prior art that is already known to a person of ordinary skill in the art.

SUMMARY

The present disclosure relates to a floor structure. Particular embodiments relate to a floor structure that may secure collision strength and improve commercial properties, such as improving interior aesthetics.

An embodiment of the present disclosure provides a floor structure of a hidden rail structure, structured to have a floor frame as a skeleton interposing a core structural member, and a seat rail is inserted between the core structural member.

A floor structure of a vehicle according to an embodiment includes a pair of side sills disposed to face each other in a vehicle width direction, and respectively formed in a vehicle length direction, a floor frame disposed between the pair of side sills and including a pair of longitudinal frames respectively arranged along the pair of side sills and at least one transverse frame mounted between the pair of longitudinal frames in the vehicle width direction, and at least one core structural member disposed in a space formed by the floor frame and made of a material for absorbing impact.

Each of the pair of side sills may be formed of a steel material, is formed by coupling of both end portions in a vertical direction of an outer frame and an inner frame, and forms an interior space. A side sill reinforcement member that may be made of aluminum extruded material is inserted into at least one interior space of the pair of side sills.

Each of the pair of longitudinal frames may include a main frame disposed in an inner surface of a corresponding side sill facing an opposite side sill, elongated along the corresponding side sill to contact the corresponding side sill, and provided with at least one partition wall in an interior of the main frame, an upper overlapping end integrally formed to an upper side of the main frame, bent from the main frame, and overlapping an upper surface of the corresponding side sill by a predetermined amount, a lower overlapping end integrally formed to a lower side of the main frame and configured to contact an inner surface of the corresponding side sill, a subframe integrally formed to a side surface of the main frame, and an engagement end integrally formed to a lower edge of the subframe.

The main frame may have a gradually smaller cross-sectional area in a direction from the side sill to the opposite side sill.

Each of the pair of longitudinal frames may be made of an aluminum extruded material.

The at least one transverse frame may include, with reference to the vehicle length direction, a front transverse frame disposed at a front, a rear transverse frame disposed at a rear, and at least one middle transverse frame disposed between the front transverse frame and the rear transverse frame.

The front transverse frame may have bottom surface that is formed as a slanted surface inclined upward forward, and is connected to a front structure by a front flange extending from the slanted surface together with the slanted surface.

The rear transverse frame may form at least one closed cross-section, and is connected to a rear structure by a rear flange extending from a rear edge.

Each of the at least one middle transverse frame may form at least one closed cross-section, and is connected to the at least one core structural member by a middle flange extending from each edge at a lower side.

Each of the at least one transverse frame is made of an aluminum extruded material.

The at least one core structural member may include a core member disposed in a space formed by the floor frame, a lower surface member made of an aluminum material and bonded to a lower portion of the core member by an adhesive, an upper surface member made of an aluminum material and bonded to an upper portion of the core member by an adhesive, and a core reinforcement member made of an aluminum extruded material and mounted to both sides of the core member in the vehicle length direction.

The core member may be made of a foam of at least one material among polyethylene terephthalate (PET), polyvinyl chloride (PVC), or polymethacrylimide (PMI).

A plurality of slots may be formed in the upper surface member in the vehicle length direction. A seat rail may be mounted to each slot.

An opening may be formed along a length direction of an upper surface of the seat rail. A lower surface of the seat rail may protrude toward and contact the lower surface member. The seat rail may be engaged with the core reinforcement member or the longitudinal frame by a mounting portion integrally formed with and protruding from both side surfaces of the seat rail.

The seat rail may be made of an aluminum extruded material.

A floor structure according to an embodiment is structured to have the floor frame as a skeleton interposing the core structural member, and the seat rail is inserted in the core structural member. Therefore, the floor structure according to an embodiment achieves a hidden rail structure to improve the interior aesthetics while securing bending rigidity and side collision performance.

In addition, by the hidden rail structure inserting the seat rail into the core structural member, the floor structure according to an embodiment may lower the height of the floor structure and lower the center of mass of a vehicle.

Other effects that may be obtained or are predicted by an embodiment will be explicitly or implicitly described in a detailed description of embodiments of the present disclosure. That is, various effects that are predicted according to embodiments will be described in the following detailed description.

The following elements may be used in connection with the figures to describe embodiments of the present invention.

| | | | |
|---|---|---|---|
| 1. | 1: floor structure | 3: battery case | |
| 2. | 10: side sill | 100: inner surface of side sill | |
| 3. | 11: outer frame | 13: inner frame | |
| 4. | 15: side sill reinforcement member | | |
| 5. | 150: partition wall of side sill reinforcement member | | |
| 6. | 20: floor frame | 21: longitudinal frame | |
| 7. | 210: main frame | 211: partition wall of main frame | |
| 8. | 213: upper overlapping end | 215: lower overlapping end | |
| 9. | 217: subframe | 219: engagement end | |
| 10. | 23: transverse frame | 230: front transverse frame | |
| 11. | 230a: front flange | 230b: slanted surface | |
| 12. | 231: middle transverse frame | 231a: middle flange | |
| 13. | 233: rear transverse frame | 233a: rear flange | |
| 14. | 30: core structural member | 31: core member | |
| 15. | 33: lower surface member | 35: upper surface member | |
| 16. | 350: slot | 37: core reinforcement member | |
| 17. | 39: adhesive | 40: seat rail | |
| 18. | 41: opening | 43: mounting portion | |
| 19. | 50: front structure | 60: rear structure | |

DETAILED DESCRIPTION OF ILLUSTRATIVE EMBODIMENTS

The present disclosure will be described more fully hereinafter with reference to the accompanying drawings, in which embodiments of the invention are shown. As those skilled in the art would realize, the described embodiments may be modified in various different ways, all without departing from the spirit or scope of the present disclosure.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, in the following description, dividing names of components into first, second, and the like is to divide the names because the names of the components are the same as each other and an order thereof is not particularly limited.

Figure 1:
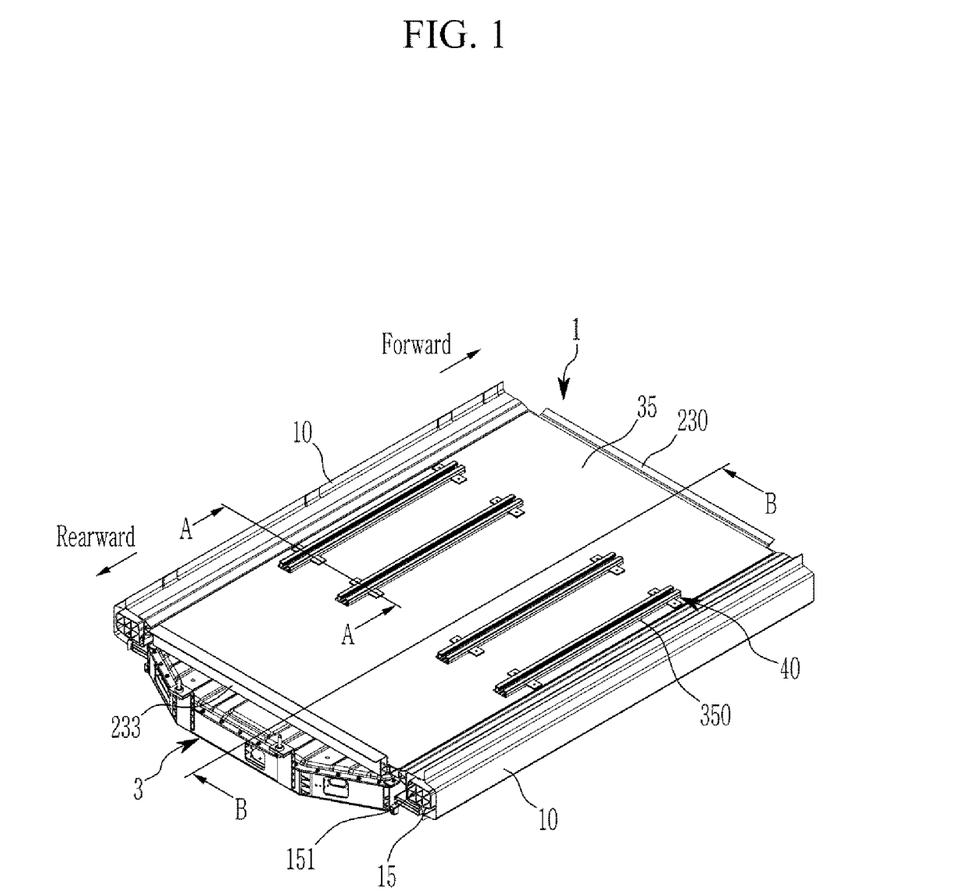
FIG. 1 is a schematic diagram of a floor structure according to an embodiment.
Figure 2:
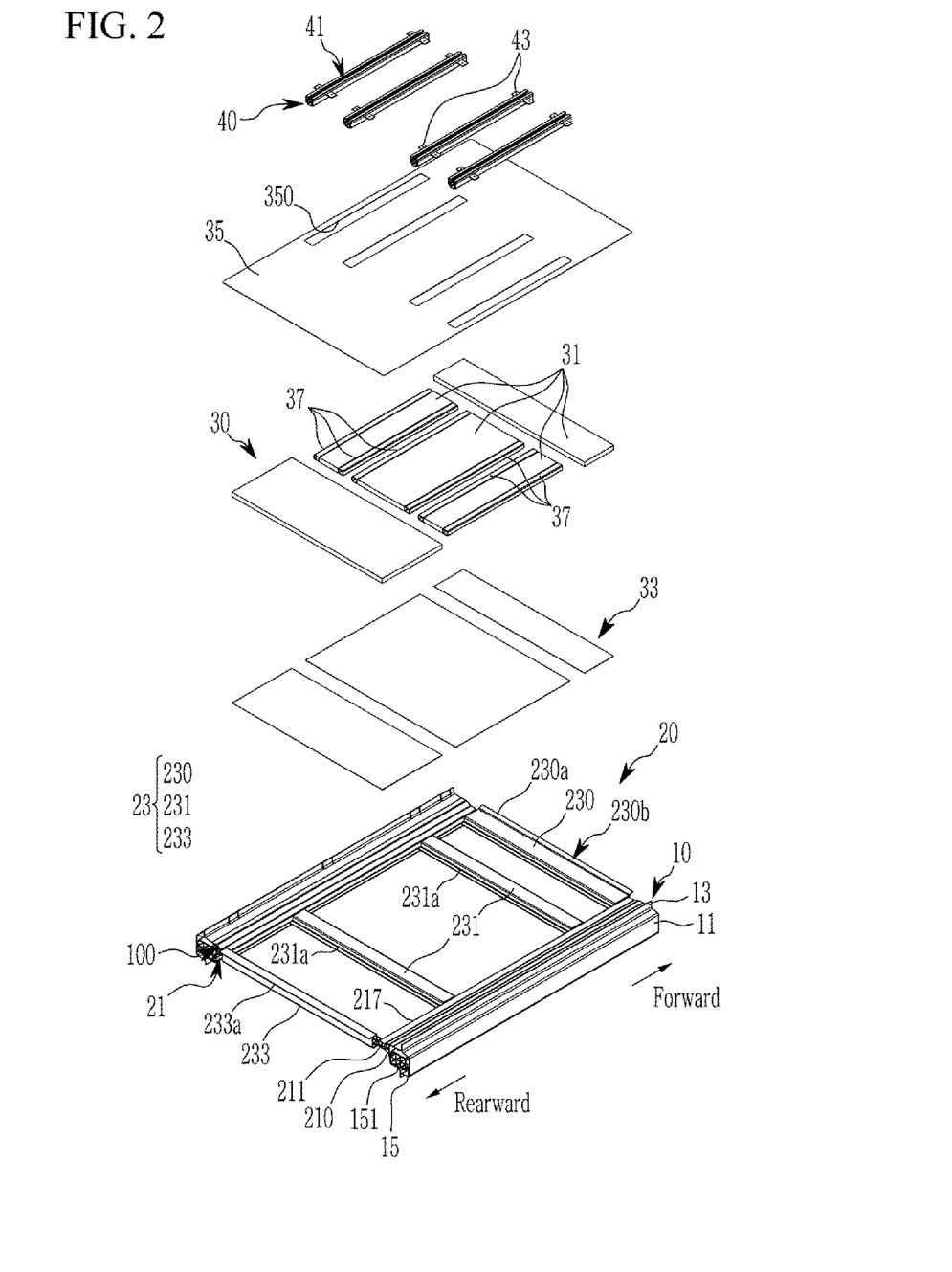
FIG. 2 is an exploded view of a floor structure according to an embodiment.
Figure 3:
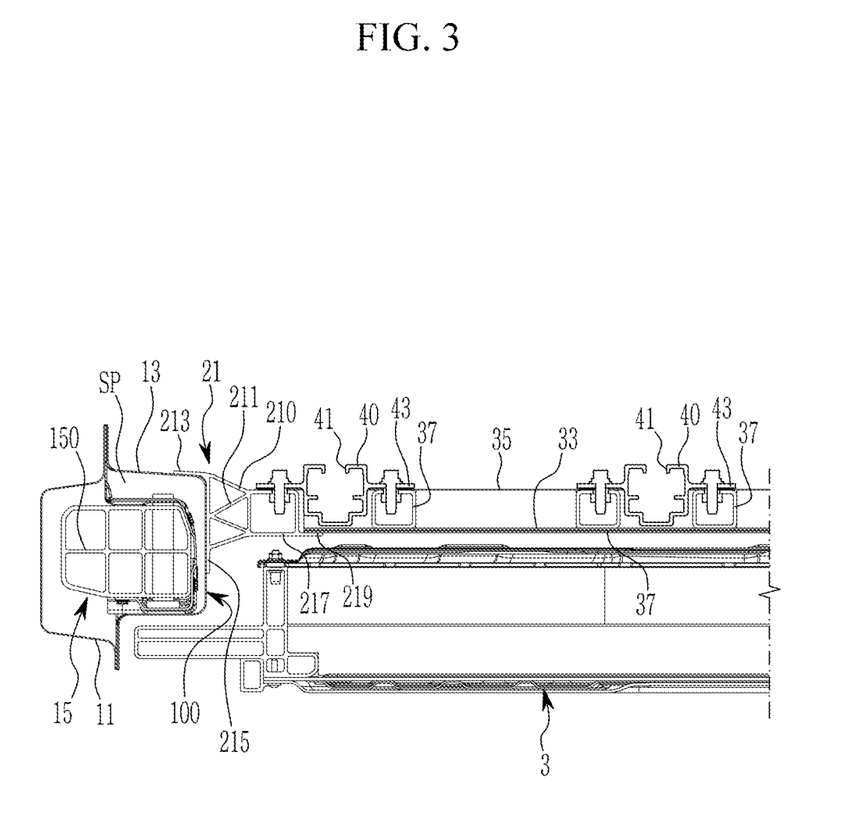
FIG. 3 is a cross-sectional view along line A-A of FIG. 1.
Figure 4:
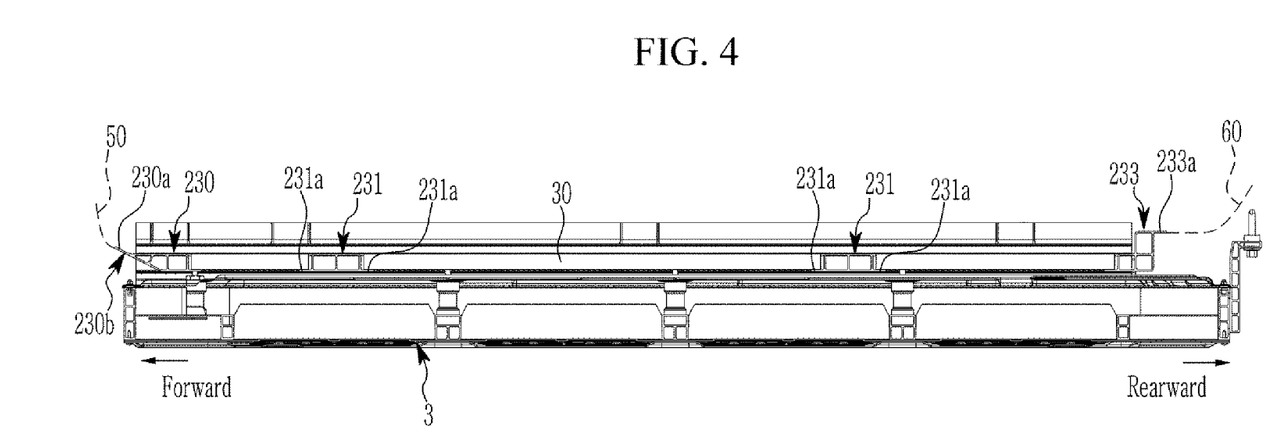
FIG. 4 is a cross-sectional view along line B-B of FIG. 1.
Figure 5:
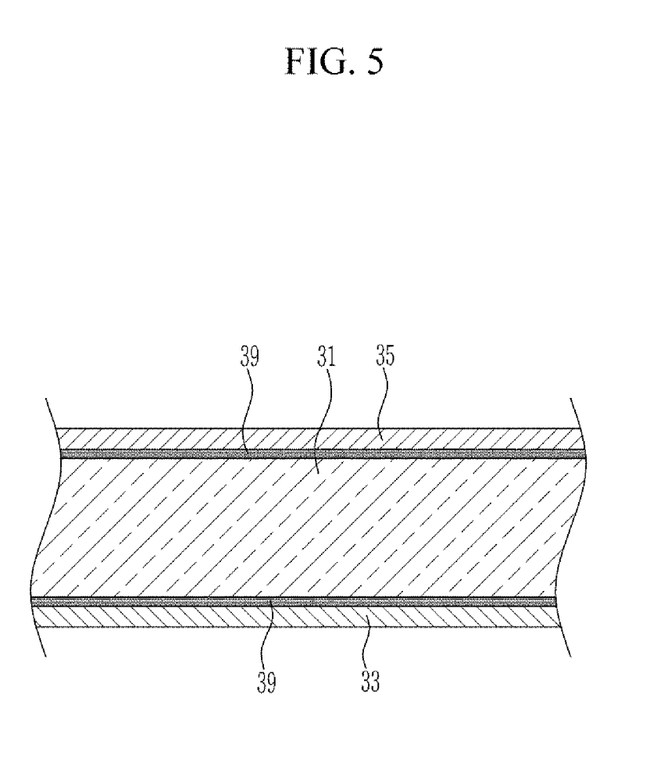
FIG. 5 is a schematic diagram of a core structural member applied to a floor structure according to an embodiment.

FIG. 1 is a schematic diagram of a floor structure according to an embodiment, FIG. 2 is an exploded view of a floor structure according to an embodiment, FIG. 3 is a cross-sectional view along line A-A of FIG. 1, FIG. 4 is a cross-sectional view along line B-B of FIG. 1, and FIG. 5 is a schematic diagram of a core structural member applied to a floor structure according to an embodiment.

A floor structure according to an embodiment may be applied to various types of mobility vehicles.

For example, a floor structure according to an embodiment may be applied to various services or means of transportation that contribute to convenient movement, such as automobiles, urban air mobility (UAM) vehicles, air means, or the like.

In an embodiment of the present invention, a floor structure applied to an automobile will be described as an example.

Referring to FIG. 1, a floor structure 1 according to an embodiment may be configured on an upper portion of a battery case 3 for an electric vehicle.

The floor structure 1 protects the battery pack accommodated in the battery case 3 and constitutes the lower part of the vehicle.

Referring to FIG. 2 to FIG. 4, the floor structure 1 according to an embodiment includes a pair of side sills 10, a floor frame 20, and a core structural member 30.

In this specification, the term "vehicle length direction" may refer to a length direction (i.e., front-and-rear direction) of the vehicle body, the term "vehicle width direction" may refer to a transverse direction of the vehicle body, and the term "vertical direction" may refer to a height direction of the vehicle body.

In addition, in this specification, the term "inner surface" of a component may refer to a surface facing an interior space (e.g., a cabin space) formed by the component, and the term "outer surface" may refer to a surface of the component opposite to the inner surface. Alternatively, the term "inner surface" of a component may refer to a surface of one component facing another component spaced apart but facing the one component, and the term "outer surface" of a component may refer to a surface of one component facing opposite of another component.

Furthermore, in this specification, "upper end portion", "upper portion", "upper end", or "upper portion surface" of a component indicates an end portion, portion, end, or surface of the component that is positioned relatively higher in the drawing, and "lower end portion", "lower portion", "lower end", or "lower portion surface" of a component indicates an end portion, portion, end, or surface of the component that is positioned relatively lower in the drawing.

The pair of side sills 10 are disposed to face each other in the vehicle width direction.

The pair of side sills 10 are configured to be symmetrical on both sides with respect to a center in the vehicle width direction, respectively, and are respectively formed in the vehicle length direction.

The pair of side sills 10 are formed of a steel material.

Each of the pair of side sills 10 is formed by coupling both end portions in a vertical direction of an outer frame 11 and an inner frame 13, and forms an interior space SP.

In addition, a side sill reinforcement member 15 is inserted into at least one interior space of the pair of side sills 10.

The side sill reinforcement member 15 is disposed to be elongated in the vehicle length direction.

The side seal reinforcement member 15 is made of an aluminum extruded material, and at least one partition wall 150 is configured in an interior of the side sill reinforcement member 15.

The floor frame 20 is configured between the pair of side sills 10.

In an embodiment, the floor frame 20 includes a pair of longitudinal frames 21 respectively arranged along the pair of side sills 10 and at least one transverse frame 23 mounted between the pair of longitudinal frames 21 in the vehicle width direction.

Each of the pair of longitudinal frames 21 includes a main frame 210, an upper overlapping end 213, a lower overlapping end 215, a subframe 217, and an engagement end 219.

The main frame 210 may be made of an aluminum extruded material.

In an inner surface of each side sill 10 facing an opposite side seal 10, the main frame 210 is elongated along a corresponding side sill 10 to contact the side sill 10.

The main frame 210 has a gradually smaller cross-sectional area in a direction from the corresponding side sill 10 to the opposite side sill 10.

In addition, at least one partition wall 211 is provided in an interior of the main frame 210.

The upper overlapping end 213 is integrally formed to an upper side of the main frame 210.

The upper overlapping end 213 is bent from the main frame 210 and overlaps an upper surface of the corresponding side sill 10 by a predetermined amount.

The lower overlapping end 215 is integrally formed to a lower side of the main frame 210.

The lower overlapping end 215 may contact an inner surface 100 of the corresponding side sill 10 to improve a contact area.

The subframe 217 is integrally formed to a side surface of the main frame 210.

The subframe 217 may be formed in a rectangular cross-section to form a closed cross-section.

In addition, the engagement end 219 is integrally formed to a lower edge of the subframe 217.

The engagement end 219 may be connected to the core structural member 30.

Each of the pair of longitudinal frames 21 may be made of an aluminum extruded material.

In addition, the at least one transverse frame 23 includes, with reference to the vehicle length direction, a front transverse frame 230 disposed at a front, a rear transverse frame 233 disposed at a rear, and at least one middle transverse frame 231 disposed between the front transverse frame 230 and the rear transverse frame 233.

The front transverse frame 230 has a bottom surface that is formed as a slanted surface 230b inclined upward in a forward direction.

The front transverse frame 230 is connected to a front structure 50 by a front flange 230a extending from the slanted surface 230b together with the slanted surface 230b.

In an embodiment, the front structure 50 may be a dash panel.

The rear transverse frame 233 forms at least one closed cross-section.

The rear transverse frame 233 is connected to a rear structure 60 by a rear flange 233a extending from a rear edge.

In an embodiment, the rear structure 60 may be a rear panel.

In addition, each of the at least one middle transverse frame 231 forms at least one closed cross-section.

Each of the at least one middle transverse frame 231 is connected to the at least one core structural member 30 by a middle flange 231a extending from each edge at a lower side.

Although it is illustrated in the drawings that two middle transverse frames 231 are disposed between the front transverse frame 230 and the rear transverse frame 233, it may be understood that the number of the middle transverse frames 231 is not limited thereto, and may be varied as needed.

Each of the at least one transverse frame 23 may be made of an aluminum extruded material.

In an embodiment, the at least one core structural member 30 is disposed in a space formed by the floor frame 20.

That is, the floor frame 20 may form several spaces horizontally, and the core structural member 30 may be formed in any, every, or desired one(s) of spaces formed by the floor frame 20.

The core structural member 30 may be made of a material for absorbing impact, and the material for absorbing impact may be any one that is known in the art.

The at least one core structural member 30 includes a core member 31, a lower surface member 33, an upper surface member 35, and a core reinforcement member 37 (refer to FIG. 5).

The core member 31 is disposed in a space formed by the floor frame 20.

For example, the core member 31 may be disposed in each of the spaces partitioned by the pair of longitudinal frames 21 and the at least one transverse frame 23.

The core member 31 may be disposed between the front transverse frame 230 and a frontmost middle transverse frame 231 among the at least one middle transverse frame 231, between the rear transverse frame 233 and a rearmost middle transverse frame 231 among the at least one middle transverse frame 231, and between adjacent pairs of the at least one middle transverse frame 231, respectively.

The core member 31 may be made of a foam including at least one material among polyethylene terephthalate (PET), polyvinyl chloride (PVC), or polymethacrylimide (PMI).

The lower surface member 33 may be made of an aluminum material.

The lower surface member 33 may be bonded to a lower portion of the core member 31 by an adhesive 39.

The lower surface member 33 may be provided in a quantity corresponding to the core member 31.

That is, the same as in the core member 31, the lower surface member 33 may be disposed between the front transverse frame 230 and a frontmost middle transverse frame 231 among the at least one middle transverse frame 231, between the rear transverse frame 233 and a rearmost middle transverse frame 231 among the at least one middle transverse frame 231, and between adjacent pairs of the at least one middle transverse frame 231, respectively.

The upper surface member 35 may be made of an aluminum material.

The upper surface member 35 may be bonded to an upper portion of the core member 31 by an adhesive 39.

The upper surface member 35 may be configured to cover the core member 31, the subframe 217 of the longitudinal frame 21, and the transverse frame 23.

The core reinforcement member 37 may be mounted to both lateral sides of the core member 31 in the vehicle length direction. For example, there may be employed several core members 31, and among the core members 31, the core reinforcement member 37 may be coupled to the core member 31 centrally disposed in the vehicle length direction, as shown in FIG. 2.

In addition, a plurality of slots 350 are formed in the upper surface member 35 in the vehicle length direction.

A seat rail 40 is mounted to each slot 350.

The seat rail 40 may be made of an aluminum extruded material.

An opening 41 is formed along a length direction of an upper surface of the seat rail 40.

A lower surface of the seat rail 40 protrudes toward and contacts the lower surface member 33.

The seat rail 40 may be engaged with the core reinforcement member 37 or the longitudinal frame 21 by a mounting portion 43 integrally formed with and protruding from both side surfaces of the seat rail 40.

The mounting portion 43 may be respectively formed at the front and rear of the seat long rail 40 in the longitudinal direction.

Figure 6:
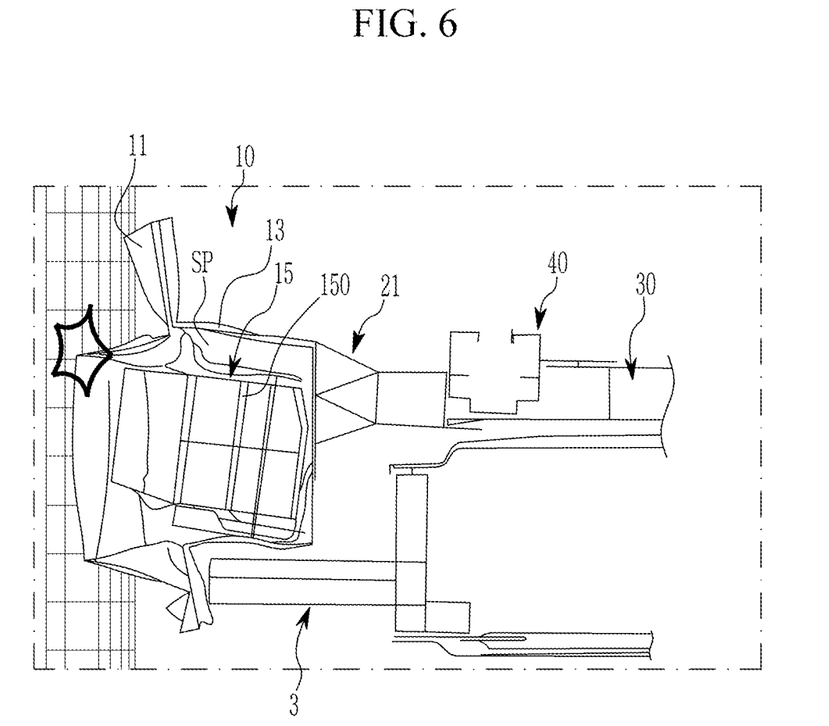
FIG. 6 is a diagram illustrating a collision experiment of a floor structure according to an embodiment.

FIG. 6 is a diagram illustrating a collision experiment of the floor structure 1 according to an embodiment.

Referring to FIG. 6, according to the floor structure 1 according to an embodiment, upon side collision, the impact force is transferred to the core structural member 30 through the side sill 10 and the floor frame 20, and may be absorbed by the core structural member 30.

At this time, the seat rail 40 serves to transfer the load.

In addition, the side sill 10 and the floor frame 20 also serve to absorb the impact force, and it is possible to prevent the breakage of the battery case 3 disposed in a lower portion of the floor structure 1.

That is, the load is concentrated on the side sill 10 and the longitudinal frame 21 of the floor frame 20, and the longitudinal frame 21 is deformed within the elastic range by the structure of the longitudinal frame 21. Therefore, the breakage of the battery case 3 and the core structural member 30 may be prevented.

The floor structure 1 according to an embodiment is structured to have the floor frame 20 as a skeleton interposing the core structural member 30, and the seat rail 40 is inserted in the core structural member 30.

Therefore, the floor structure 1 according to an embodiment achieves a hidden rail structure to improve the interior aesthetics while securing bending rigidity and side collision performance.

In addition, by the hidden rail structure inserting the seat rail 40 into the core structural member 30, the floor structure 1 according to an embodiment may lower the height of the floor structure 1 and lower the center of mass of a vehicle.

Accordingly, the floor structure 1 may improve the convenience for the passengers getting on and off.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A floor structure of a vehicle, the floor structure comprising: a pair of side sills disposed to face each other in a vehicle width direction, and respectively disposed in a vehicle length direction; a floor frame disposed between the pair of side sill and comprising a pair of longitudinal frames respectively arranged along the pair of side sills and at least one transverse frame mounted between the pair of longitudinal frames in the vehicle width direction; and at least one core structural member disposed in a space provided by the floor frame and comprising a material for absorbing impact.

2. The floor structure of claim 1, wherein: each of the pair of side sills comprises a steel material, has both end portions coupled in a vertical direction of an outer frame and an inner frame, respectively, and provides an interior space; and a side sill reinforcement member comprising an aluminum extruded material is disposed in at least one of the interior spaces of the pair of side sills.

3. The floor structure of claim 1, wherein each of the pair of longitudinal frames comprises: a main frame disposed in an inner surface of a corresponding side sill facing an opposite side sill, elongated along the corresponding side sill to contact the corresponding side sill, and provided with at least one partition wall in an interior of the main frame; an upper overlapping end formed integrally to an upper side of the main frame, bent from the main frame, and overlapping an upper surface of the corresponding side sill by a predetermined amount; a lower overlapping end integrally formed to a lower side of the main frame and contacting an inner surface of the corresponding side sill; a subframe integrally formed to a side surface of the main frame; and an engagement end integrally formed to a lower edge of the subframe.

4. The floor structure of claim 3, wherein the main frame has a gradually smaller cross-sectional area in a direction from the corresponding side sill to the opposite side sill.

5. The floor structure of claim 1, wherein each of the pair of longitudinal frames comprises an aluminum extruded material.

6. The floor structure of claim 1, wherein the at least one transverse frame comprises an aluminum extruded material.

7. A floor structure of a vehicle, the floor structure comprising: a pair of side sills disposed to face each other in a vehicle width direction, and respectively disposed in a vehicle length direction; a floor frame disposed between the pair of side sills, the floor frame comprising: a pair of longitudinal frames respectively arranged along the pair of side sills; a front transverse frame mounted between the pair of longitudinal frames in the vehicle width direction at a front of the vehicle in the vehicle length direction; a rear transverse frame mounted between the pair of longitudinal frames in the vehicle width direction at a rear of the vehicle in the vehicle length direction; and at least one middle transverse frame mounted between the pair of longitudinal frames in the vehicle width direction and disposed between the front transverse frame and the rear transverse frame; and at least one core structural member disposed in a space provided by the floor frame and comprising a material for absorbing impact.

8. The floor structure of claim 7, wherein the front transverse frame has bottom surface that is formed as a slanted surface inclined upward in a forward direction, and is connected to a front structure by a front flange extending from the slanted surface together with the slanted surface.

9. The floor structure of claim 7, wherein the rear transverse frame includes at least one closed cross-section, and is connected to a rear structure by a rear flange extending from a rear edge.

10. The floor structure of claim 7, wherein the at least one middle transverse frame includes at least one closed cross-section, and is connected to the at least one core structural member by a middle flange extending from each edge at a lower side.

11. The floor structure of claim 7, wherein: each of the pair of side sills comprises a steel material, has both end portions coupled in a vertical direction of an outer frame and an inner frame, respectively, and provides an interior space;

and a side sill reinforcement member comprising an aluminum extruded material is disposed in at least one of the interior spaces of the pair of side sills.

12. The floor structure of claim 7, wherein each of the pair of longitudinal frames comprises: a main frame disposed in an inner surface of a corresponding side sill facing an opposite side sill, elongated along the corresponding side sill to contact the corresponding side sill, and provided with at least one partition wall in an interior of the main frame; an upper overlapping end formed integrally to an upper side of the main frame, bent from the main frame, and overlapping an upper surface of the corresponding side sill by a predetermined amount; a lower overlapping end integrally formed to a lower side of the main frame and contacting an inner surface of the corresponding side sill; a subframe integrally formed to a side surface of the main frame; and an engagement end integrally formed to a lower edge of the subframe.

13. The floor structure of claim 7, wherein each of the pair of longitudinal frames comprises an aluminum extruded material.

14. A floor structure of a vehicle, the floor structure comprising: a pair of side sills disposed to face each other in a vehicle width direction, and respectively disposed in a vehicle length direction; a floor frame disposed between the pair of side sills and comprising a pair of longitudinal frames respectively arranged along the pair of side sills and at least one transverse frame mounted between the pair of longitudinal frames in the vehicle width direction; and at least one core structural member comprising a material for absorbing impact, wherein the at least one core structural member comprises: a core member disposed in a space formed by the floor frame; a lower surface member comprising a first aluminum material and bonded to a lower portion of the core member by a first adhesive; an upper surface member comprising a second aluminum material and bonded to an upper portion of the core member by a second adhesive; and a core reinforcement member comprising an aluminum extruded material and mounted to both sides of the core member in the vehicle length direction.

15. The floor structure of claim 14, wherein the core member comprises a foam comprising polyethylene terephthalate (PET), polyvinyl chloride (PVC), or polymethacrylimide (PMI).

16. The floor structure of claim 14, further comprising:
a plurality of slots provided in the upper surface member in the vehicle length direction; and
a seat rail mounted to each of the plurality of slots.

17. The floor structure of claim 16, further comprising an opening disposed along a length direction of an upper surface of the seat rail.

18. The floor structure of claim 17, wherein:
a lower surface of the seat rail protrudes toward and contacts the lower surface member; and
the seat rail is engaged with the core reinforcement member or one of the pair of longitudinal frames by a mounting portion integrally formed with and protruding from both side surfaces of the seat rail.

19. The floor structure of claim 16, wherein the seat rail comprises a second aluminum extruded material.

20. The floor structure of claim 14, wherein each of the pair of longitudinal frames comprises: a main frame disposed in an inner surface of a corresponding side sill facing an opposite side sill, elongated along the corresponding side sill to contact the corresponding side sill, and provided with at least one partition wall in an interior of the main frame; an upper overlapping end formed integrally to an upper side of the main frame, bent from the main frame, and overlapping an upper surface of the corresponding side sill by a predetermined amount; a lower overlapping end integrally formed to a lower side of the main frame and contacting an inner surface of the corresponding side sill; a subframe integrally formed to a side surface of the main frame; and an engagement end integrally formed to a lower edge of the subframe.

* * * * *